(12) United States Patent
Dodson et al.

(10) Patent No.: US 8,560,964 B2
(45) Date of Patent: Oct. 15, 2013

(54) METHOD AND SYSTEM FOR PREDICTIVE BROWSING

(75) Inventors: Christopher N. Dodson, Indian Trail, NC (US); Keith R. Walker, Austin, TX (US); Brian M. O'Connell, Cary, NC (US); Richard A. Locke, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1175 days.

(21) Appl. No.: 12/034,526

(22) Filed: Feb. 20, 2008

(65) Prior Publication Data

US 2009/0210806 A1    Aug. 20, 2009

(51) Int. Cl.
  *G06F 3/048* (2006.01)
  *G06F 3/00* (2006.01)
(52) U.S. Cl.
  USPC ........... 715/819; 715/744; 715/745; 715/760; 715/816; 715/817
(58) Field of Classification Search
  USPC ................ 715/744, 760, 816, 745, 817, 819
  See application file for complete search history.

(56) References Cited

U.S. PATENT DOCUMENTS

| | | | |
|---|---|---|---|
| 5,727,129 A * | 3/1998 | Barrett et al. | 706/10 |
| 5,898,836 A * | 4/1999 | Freivald et al. | 709/218 |
| 6,707,470 B1 * | 3/2004 | Sashihara | 715/745 |
| 6,807,570 B1 * | 10/2004 | Allen et al. | 709/219 |
| 7,669,136 B1 * | 2/2010 | Gaware et al. | 715/760 |
| 7,788,219 B2 * | 8/2010 | Harris | 707/609 |
| 2002/0013825 A1 * | 1/2002 | Freivald et al. | 709/218 |
| 2005/0132296 A1 * | 6/2005 | Milic-Frayling et al. | 715/819 |
| 2005/0273718 A1 * | 12/2005 | Naas | 715/745 |
| 2006/0259867 A1 * | 11/2006 | Watson et al. | 715/760 |
| 2008/0005672 A1 * | 1/2008 | Mestres et al. | 715/700 |
| 2008/0126176 A1 * | 5/2008 | Iguchi | 705/10 |
| 2008/0288492 A1 * | 11/2008 | Gemmell et al. | 707/7 |
| 2009/0006442 A1 * | 1/2009 | Anderson et al. | 707/102 |
| 2009/0164395 A1 * | 6/2009 | Heck | 706/16 |

\* cited by examiner

*Primary Examiner* — Weilun Lo
*Assistant Examiner* — Dino Kujundzic
(74) *Attorney, Agent, or Firm* — Heslin Rothenberg Farley & Mesiti P.C.

(57) ABSTRACT

In a method for automatically navigating potential websites for predictive browsing based on user activities along with efficiency of verifying content updates, a Uniform Resource Locator (URL) of websites and its associated attributes that a user visits can be recorded and stored in a storage engine. The potential sites can be predicted by a predictive engine component based upon a past browsing history and various environmental factors that are recorded in the storage engine. A dynamic content detection engine component examines each potential websites and detects if the site has been updated. The predictive engine component enables the user to navigate to the potential websites thereby permitting faster website browsing.

20 Claims, 10 Drawing Sheets

METHOD AND SYSTEM FOR PREDICTIVE BROWSING

TECHNICAL FIELD

Embodiments are generally related to data-processing systems and methods. Embodiments also relate in general to the field of computers and similar technologies, and in particular to software utilized in this field. In addition, embodiments relate to Web browsing technologies.

BACKGROUND OF THE INVENTION

The Internet and the World Wide Web (i.e., the "Web") have become critical, integral parts of commercial operations, personal lives, and the education process. The World Wide Web enables users of the Internet to conveniently access resources offered by the Internet. In the Web environment, information resources are typically stored in the form of hypertext documents called "web pages" which can be accessed and read by users of the Web. The web pages are typically stored on web servers coupled to the Internet. Each web page can be uniquely identified by an address called a Uniform Resource Locator (URL) that enables users to access the web page.

Users typically access the web pages utilizing a software application called a "web browser" which executes on a client computer coupled to the Internet, The web browser is a type of client application that enables users to select, retrieve, and perceive resources on the Web. Examples of web browsers include the Mozilla® Firefox® browser, the Microsoft® Internet Explorer®, and so forth. Firefox is a registered trademark of Mozilla Foundation in the United States, other countries, or both. Internet Explorer is a registered trademark of Microsoft Corporation in the United States, other countries, or both. Web browser users perform a broad variety of activities ranging from activities for accessing information such as news, weather information, sports related information, stock and business information, etc. It is common practice for users to visit sets of websites in a distinguishable pattern. For example, the user may visit the same websites every morning to check local news, national news, and the joke of the day. The same user may commonly visit sites containing local weather and traffic conditions at some other time. The user may visit other sets of websites in a distinguishable pattern throughout the day.

The majority of prior art web browsers have been developed to reduce the time that the user spends in accessing web pages or information of interest to the user. Some browsers enable a user to manually create "bookmarks" for web sites and determine how to categorize them within their bookmarks list. Such a list may be unwieldy and cumbersome depending on the number of websites. The user must manually navigate to the desired website in their bookmarks list. Additionally, it is inefficient to visit book-marked sites that have not been modified since the last visit. Visiting sites that have no new content wastes a user's time. Note that browser "plug-ins" have been implemented, which can monitor pages for changes and provide alerts when changed. Such features are not the same as "clicking" a link, but do solve a part of the problem associated with so-called "stale" sites. One such an example of this type of plug-in is a Firefox® plug-in referred to as Update Notifier™, and which is available at the following website: http://www.longfocus.com/firefox/updatenotifier/.

Other browsers maintain a history of web pages or web sites visited by the user. Such a history lists web pages or web sites the user visited. It does not enable the user to differentiate visited web sites that were of interest from visited web sites that were not of interest, except if the user manually maintains the history as he or she browses, such as by deleting from "history" visited web sites that were not of interest. Another exception involves the case where a user has browsed a site many times, and therefore may use the history feature of some browsers to sort the history by the particular sites(s) most viewed.

A user generally must manually navigate to the desired website in their list of recently visited sites. Similarly, in a memory method, the user must manually type in the URL of the desired website from memory into the address bar for each website repeated visit, which can be a difficult task for many users. Prior methods often require extraneous user involvement with the web browser interface to navigate often-visited websites.

Therefore, a need exists for an improved method for predictive browsing that automatically navigates to often-visited websites based on a user's browsing behavior and verifies content updates of often-visited websites, as disclosed in further detail herein.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved data-processing method, system and computer-usable medium.

It is another aspect of the present invention to provide for a method, system and computer-usable medium for predictive browsing.

It is a further aspect of the present invention to provide for a method, system and computer-usable medium for automatically navigating often-visited websites based on a user's browsing behavior.

The aforementioned aspects and other objectives and advantages can now be achieved as described herein. A method and system for automatically navigating potential websites for predictive browsing based on user activities along with efficiency of verifying content updates is disclosed herein. A URL (Uniform Resource Locator) of user-visited websites and its associated attributes can be recorded and stored in a storage engine. The potential sites can be predicted by a predictive engine component based upon a past browsing history and various environmental factors recorded in the storage engine. A dynamic content detection engine component examines each potential website and detects if the site has been updated. The predictive engine enables the user to navigate to the potential sites thereby permitting the user to browse websites faster.

The attributes associated with potential websites include but are not limited to the day-of-week, time-of-day, prior website visited and total number of visits. The predictive engine component can prompt the user to select a site from a plurality of websites if the predictive engine component is unable to uniquely select a site based on previous browsing activity. The selection becomes a preference that can be stored within a preference table. A learning component can also be utilized to note the activity of the system and to rank the website based on the user's activities.

The dynamic content detection component includes multiple methods to detect content modification such as header-based detection, content comparison, and non-essential change detection and user selectable content section. The present invention can be implemented in the context of web browser applications, such as Firefox® or Internet Explorer®. The embodiments described herein may be realized in web-browser associated software, which may or may not be part of the browser itself, such as a cooperating stand-alone software application or a web browser plug-in module. The user interface of a browser can also be modified to include a graphically displayed button to invoke predictive web browsing.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope of such embodiments.

Figure 1:
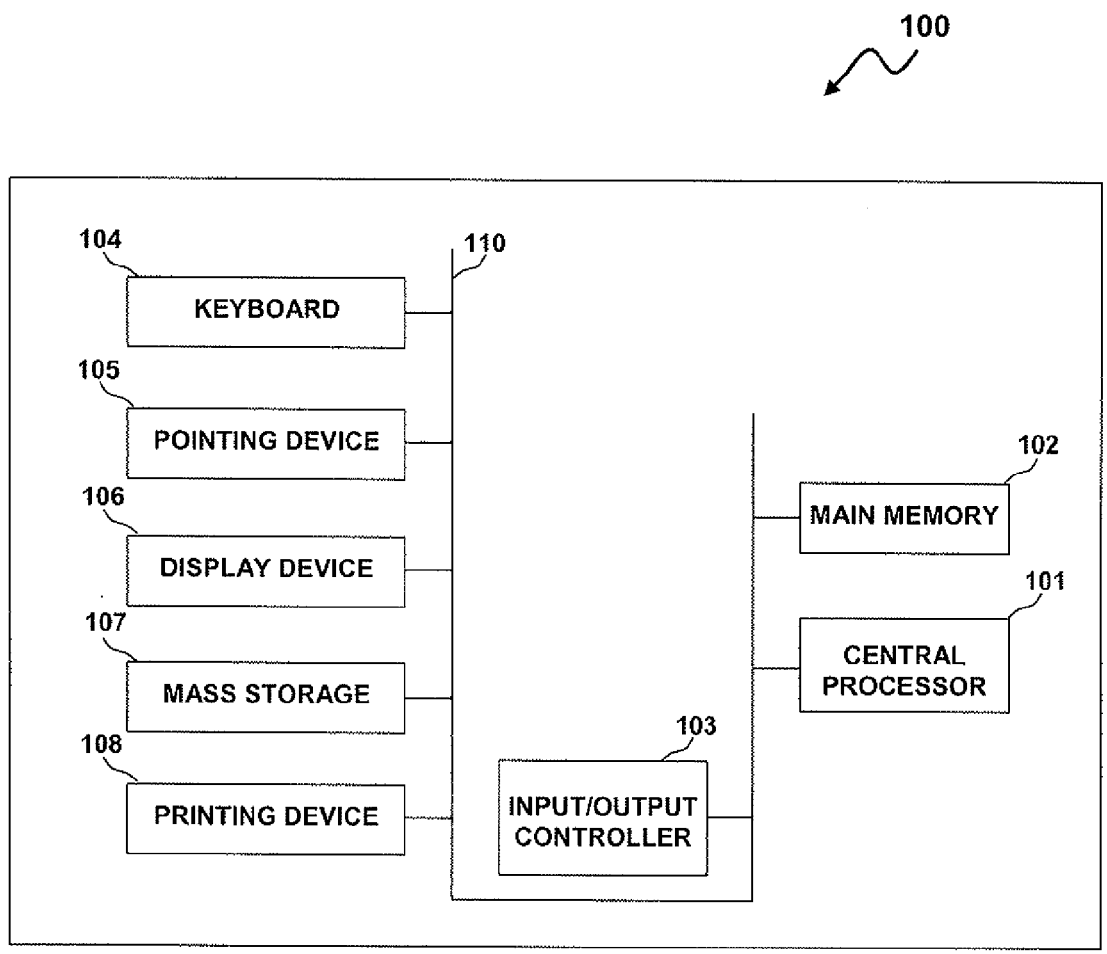
FIG. 1 illustrates a schematic view of a computer system in which the present invention may be embodied.
Figure 2:
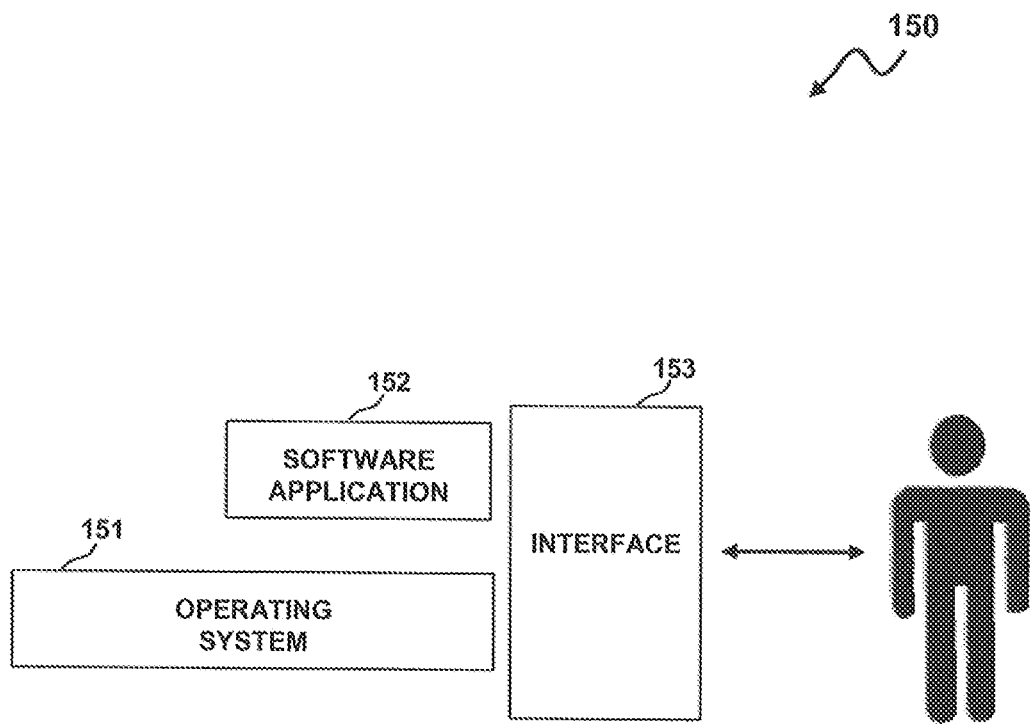
FIG. 2 illustrates a schematic view of a software system including an operating system, application software, and a user interface for carrying out the present invention.
Figure 3:
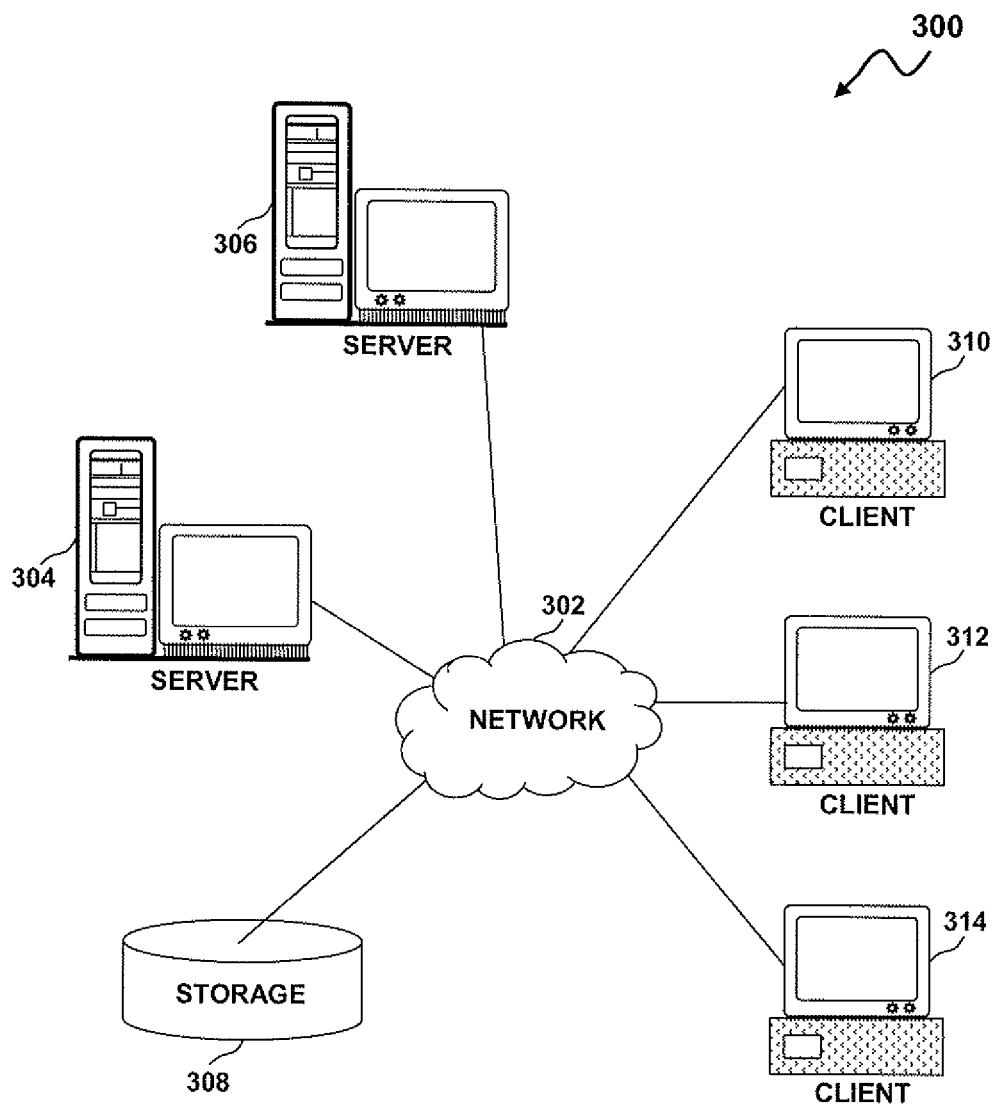
FIG. 3 depicts a graphical representation of a network of data-processing systems in which aspects of the present invention may be implemented.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention.

As depicted in FIG. 1, the present invention may be embodied in the context of a data-processing apparatus 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the data-processing apparatus 100 as desired. As illustrated, the various components of the data-processing apparatus 100 communicate through a system bus 110 or similar architecture.

Illustrated in FIG. 2, a computer software system 150 is provided for directing the operation of the data-processing apparatus 100. Software system 150, which is stored in main memory 102 and on mass storage 107, includes a kernel or operating system 151 and a shell or interface 153. One or more application programs, such as application software 152, may be "loaded" (i.e., transferred from mass storage 107 into main memory 102) for execution by the data-processing apparatus 100. The data-processing apparatus 100 receives user commands and data through user interface 153; these inputs may then be acted upon by the data-processing apparatus 100 in accordance with instructions from operating module 151 and/or application module 152.

The interface 153, which is preferably a graphical user interface (GUI), also serves to display results, whereupon the user may supply additional inputs or terminate the session. In an embodiment, operating system 151 and interface 153 can be implemented in the context of a "Windows" system. Application module 152, on the other hand, can include instructions, such as the various operations described herein with respect to the various components and modules described herein, such as, for example, the method 600 depicted in FIG. 6.

FIG. 3 depicts a graphical representation of a network of data-processing systems in which aspects of the present invention may be implemented. Network data-processing system 300 is a network of computers in which embodiments of the present invention may be implemented. Network data-processing system 300 contains network 302, which is the medium used to provide communications links between various devices and computers connected together within network data-processing system 300. Network 302 may include connections, such as wire, wireless communication links, or fiber optic cables.

In the depicted example, server 304 and server 306 connect to network 302 along with storage unit 308. In addition, clients 310, 312, and 314 connect to network 302. These clients 310, 312, and 314 may be, for example, personal computers or network computers. Data-processing apparatus 100 depicted in FIG. 1 can be, for example, a client such as client 310, 312, and/or 314. Alternatively, data-processing apparatus 100 can be implemented as a server, such as servers 304 and/or 306, depending upon design considerations.

In the depicted example, server 304 provides data, such as boot files, operating system images, and applications to clients 310, 312, and 314. Clients 310, 312, and 314 are clients to server 304 in this example. Network data-processing system 300 may include additional servers, clients, and other devices not shown. Specifically, clients may connect to any member of a network of servers which provide equivalent content.

In the depicted example, network data-processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data-processing system 300 also may be implemented as a number of different types of networks, such as for example, an intranet, a local area network (LAN), or a wide area network (WAN). FIG. 1 is intended as an example, and not as an architectural limitation for different embodiments of the present invention.

The following description is presented with respect to embodiments of the present invention, which can be embodied in the context of a data-processing system such as data-processing apparatus 100, computer software system 150 and network data-processing system 300 and network 302 depicted respectively FIGS. 1-3. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh®, UNIX®, LINUX®, and the like. Macintosh is a registered trademark of Apple Inc. in the United States, other countries, or both. UNIX is a registered trademark of The Open Group in the United States and other countries. LINUX is a registered trademark of Linus Torvalds in the United States, other countries, or both. The description of the exemplary embodiments, which follows, is for purposes of illustration and not considered a limitation.

The present invention can be implemented into a web browser application, such as Firefox® or Internet Explorer®. The invention described herein may be realized as web-browser associated software, which may or may not be part of the browser itself, such as a cooperating stand-alone software application or a web browser plug-in module. Note that the term "plug-in" generally refers to a software module or software program application that can easily be installed and used as a part of a Web browser. Once installed, plug-in applications are recognized by the browser and its function integrated into the main HyperText Markup Language ("HTML") (and/or other format) files being presented. As such, it will be recognized by those skilled in the art that the methods for predictive browsing, as described herein, can be accomplished by any piece of software, the results of which being made available to other browser-related functions and software.

Figure 4:
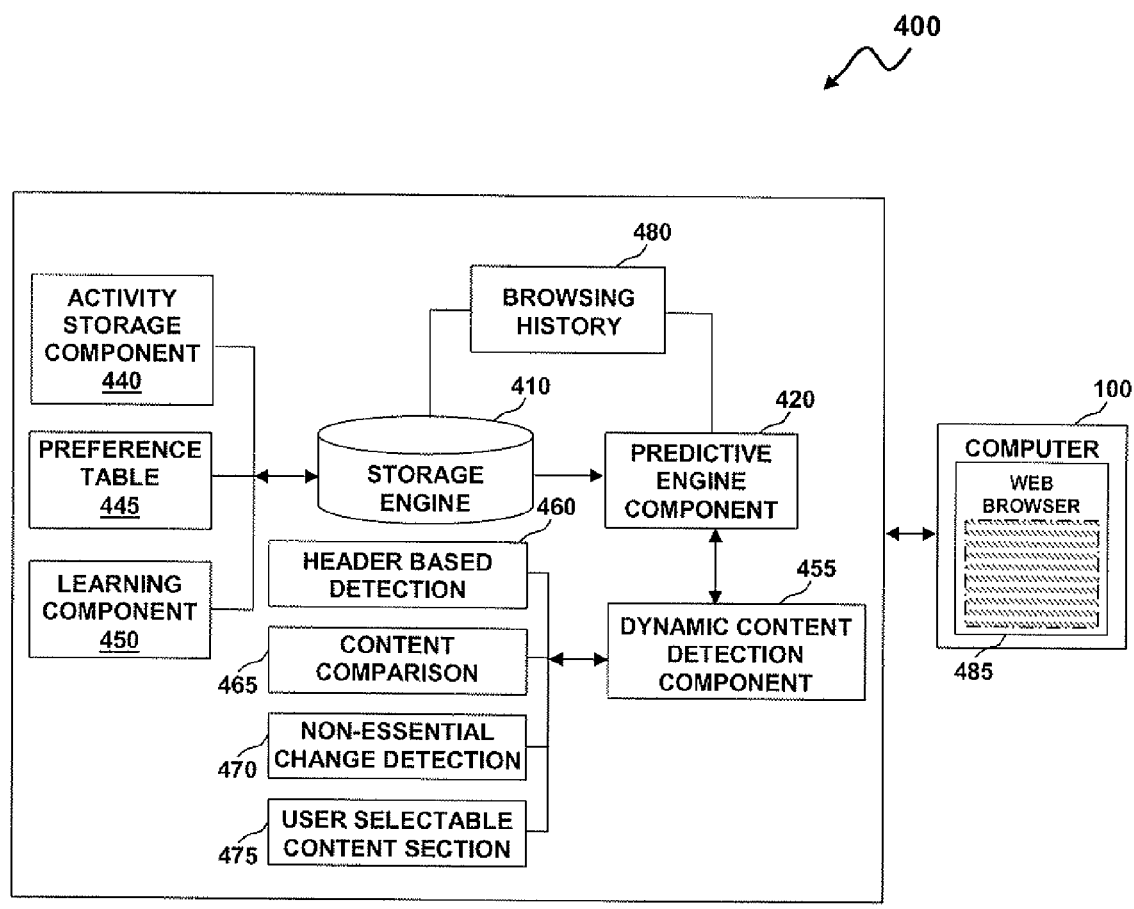
FIG. 4 illustrates a block diagram of the computer system depicting various modules for predictive browsing, which can be implemented in accordance with the present invention.

Referring to FIG. 4 a block diagram of the computer system 400 depicting various modules for predictive browsing is illustrated, which can be implemented in accordance with the present invention. The computer system 400 includes a computer 100, a storage engine 410, a dynamic content detection engine component 455 and a predictive engine component 420. The storage engine 410 includes a pattern (i.e., referred to as "activity" in the FIG. 4 diagram) storage component 440, a preference table 445 and a learning component 450. The pattern (i.e., again, referred to as "activity" in the diagram of FIG. 4) storage component 440 records attributes of a user's browsing activity from a web browser 485 into a data store such as the storage engine 410. The preference table 445 stores user site preferences. The predictive engine component 420 makes a prediction of sites that the user is most likely to be interested in based upon past browsing history 480, various environmental factors stored in the storage engine 410. The websites can be automatically added to the interest list based on the past browsing history 480.

It will be appreciated that the predictive engine component 420 can also prompt the user to select a site from a plurality of websites that the user has recently visited. The selection becomes a preference that can be stored within the preference table 445. The learning component 450 can be utilized to note the activity of the system 400 and to rank the website based on the user activities. For example, if the user requests to be directed to another website in a time period too short to have read content on the website the ranking for that website can be decreased and can be noted by the learning component 450. The predictive engine component 420 further invokes the dynamic content detection engine component 455 to verify content updates. The dynamic content detection component 455 detects when the content has been modified for a specified URL. The dynamic content detection component 455 include multiple methods to detect content modification such as header based detection 460, content comparison 465, non-essential change detection 470 and user selectable content sections 475.

Figure 5:
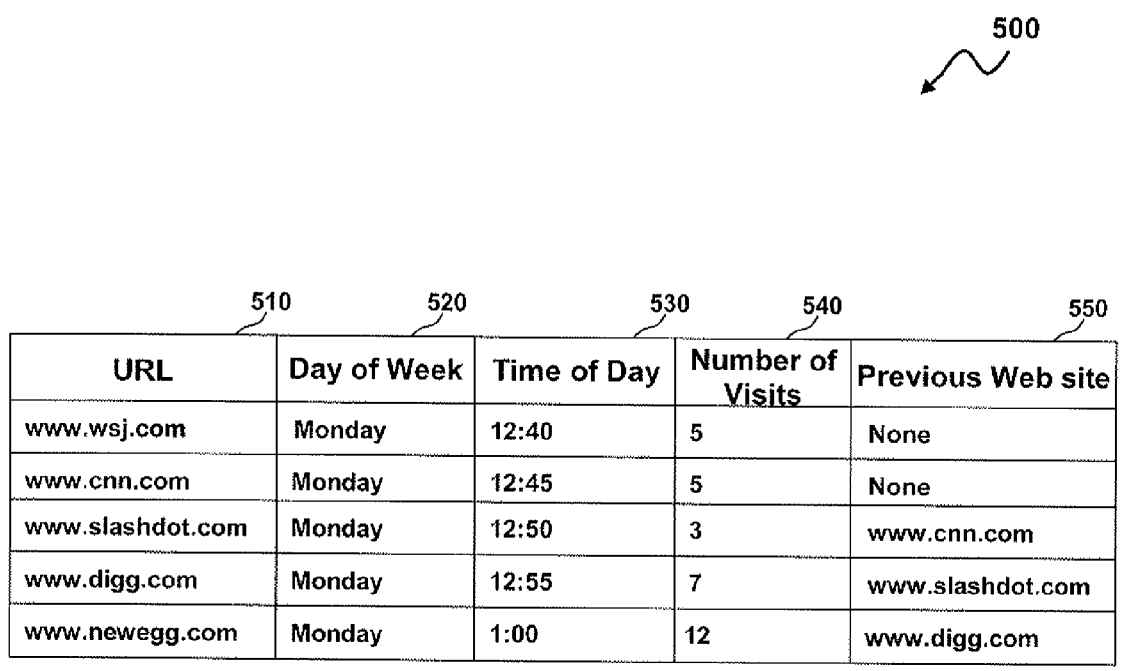
FIG. 5 illustrates an example prediction table stored in a storage engine in accordance with a preferred embodiment.

Referring to FIG. 5, an example prediction table 500 stored in the storage engine 410 is illustrated in accordance with a preferred embodiment. The prediction table 500 includes attributes such as the URL for the website 510, day-of-week 520, time-of-day 530, number of visits 540 and previous website 550. The attributes can be stored in the storage engine 410 and can be indexed. The prediction table 500 as disclosed herein is for illustrative purposes only and is not considered a limiting feature of the embodiments.

Figure 6:
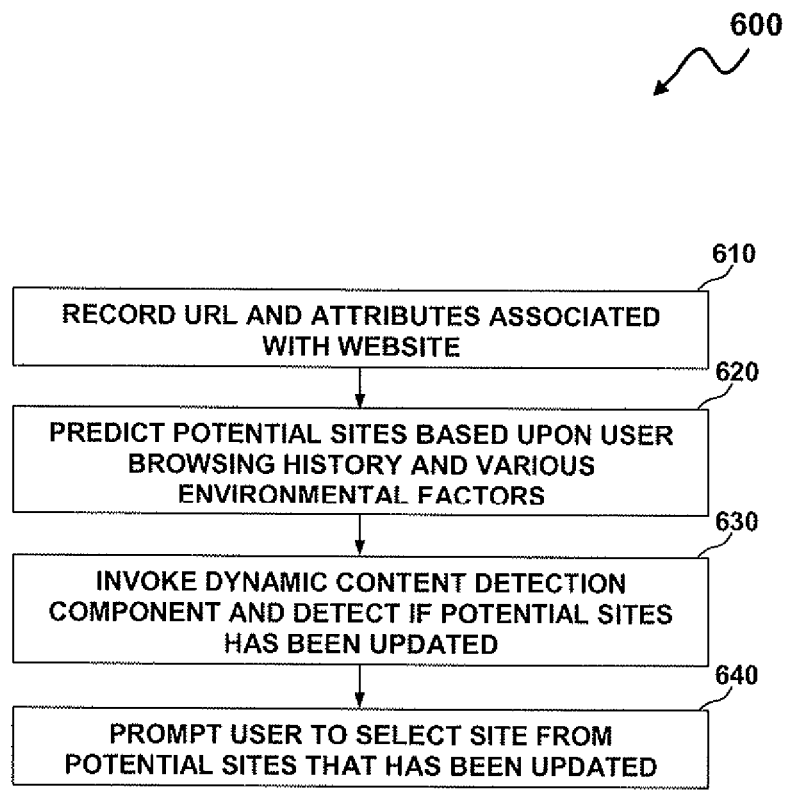
FIG. 6 illustrates a detailed flow chart of operations illustrating logical operational steps of a method for automatically navigating often-visited websites along with efficiency of verifying content updates, which can be implemented in accordance with a preferred embodiment.

Referring to FIG. 6 a detailed flow chart of operations illustrating logical operational steps of a method 600 for automatically navigating potential websites based on user activities along with efficiency of verifying content updates is illustrated, which can be implemented in accordance with a preferred embodiment. The URL of websites 510 that a user visits and attributes associated with the website 510 can be recorded and stored in the storage engine 410, as shown at block 610. The potential attributes recorded include but are not limited to the day-of-week 520, time-of-day 530, prior website visited and the total number of visits 540.

The potential sites can be predicted based upon the user browsing history 480 and various environmental factors such as the day-of-week 520, time-of-day 530, and other type attributes that are collected by the storage engine 410, as depicted at block 620. Thereafter, as indicated at block 630, the dynamic content detection engine component 455 can detect whether the site has been updated. The dynamic content detection engine component 455 provides methods to avoid false positive matches on updates to the website 510 that are not central to the website's content, for example, a dynamic advertisement record. The user can be prompted to select a site from potential sites that has been updated, as shown at block 640.

Figure 7:
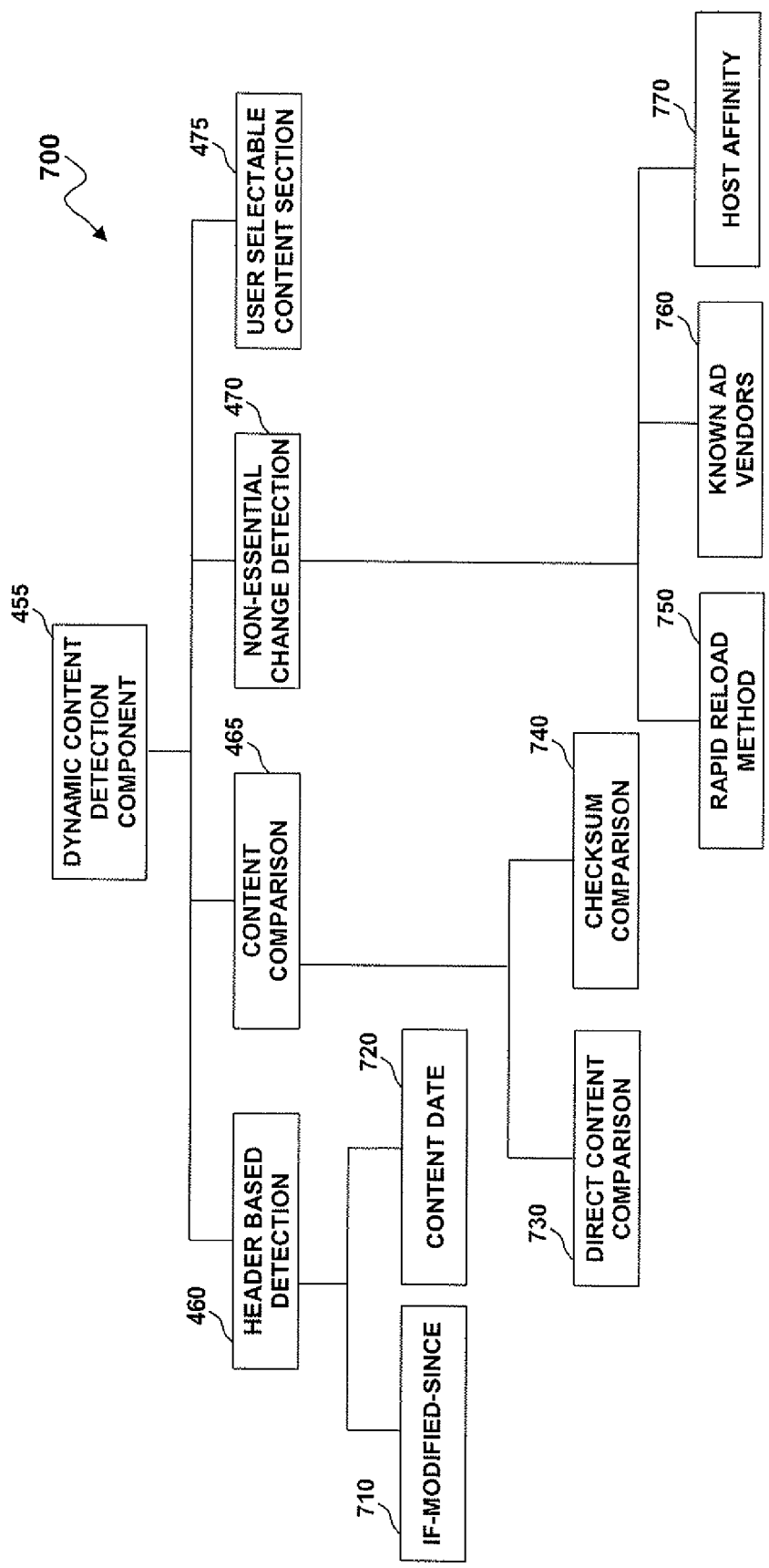
FIG. 7 illustrates a flow diagram illustrating methods of a dynamic content detection component, which can be implemented in accordance with a preferred embodiment.

FIG. 7 illustrates a flow diagram depicting a method 700 for implementing a dynamic content detection component 455, in accordance with a preferred embodiment. As depicted in the method 700 of FIG. 7, the dynamic content detection engine component 455 generally includes multiple methods to detect content modification such as the header-based detection 460, the content comparison 465, the non-essential change detection 470 and the user selectable content section 475. The dynamic content detection engine component 455 examines headers in a header-based detection 460 to detect if the content has changed since the last time a website has been visited.

For example, an "If-Modified-Since" component 710 can send a request to the web with an "If-Modified-Since" header with a value containing the last time the site was visited. (Note that in header variables typically do not contain spaces, and in this example, a programmer likely would not use a combination of a hyphen and space to separate words.) The web servers can respond with a "304" response code if the content has not changed since the specified time. The "304" response code is a Hypertext Transfer Protocol (HTTP) response status code that does not indicate an error, but rather indicates that the resource for the requested URL has not changed since last accessed or cached. The "if-Modified-Since" component 710 can then assume new content exists if the response code is other than the "304" response code. Similarly, in the header section of an HTTP response, the server 306 specifies the date of the content utilizing a "date header". The content date component method 720 may request the headers for a specified URL and compare the date from the last time the site was visited to the date at time of current request. If the dates are different the components can assume new content exists.

The content comparison method 465 examines the return content to detect if the content has changed since the last time a site has been visited. The content comparison method 465 further includes methods such as direct content comparison 730 and checksum comparison 740. The direct content comparison 730 can compare the text of the previous visit to the website 550 and the text returned whilst checking for new content utilizing known text comparison methods. The checksum comparison method 740 can compare the checksum for the previous visit to the website 550 and the checksum for the text returned whilst checking for new content. The checksum method 740 can be advantageous to the direct content comparison method 730 because the entirety of the text for the web site does not need to be stored. Note that the aforementioned methods and any content comparison method for that matter may be used in isolation or in any combination. For example, the non-essential change method 470 may operate prior to a checksum comparison 740 so that the checksum is performed after dynamic content such as ads are removed.

The sections and components of a website may be dynamic and therefore they are modified every time a particular page is visited. These modifications are not essential to website content. The non-essential change detection method 470 detects sections and components of a website that are dynamic and not essential to the website content. The non-essential change detection method 470 further includes methods such as rapid reload method 750, known ad vendors' method 760 and host affinity method 770 to detect the dynamic contents. The system 400 may rapidly reload the content of a website. For example, the system 400 may reload a website 20 times in 10 seconds. In a rapid reload method 750, the sections of the website that change 85% of the time during that reload test can be deemed dynamic, changes to the content in that sections will indicate to the system that the website possess new content. The known ad vendors' method 760 can automatically detect changes from known ad vendors such as Google® AdWords™, or Google® DoubleClick™. Google is a registered trademark of Google Inc. in the United States, other countries, or both. The known ad vendors method 760 detects changes to sections of websites from known ad vendors and will not indicate to the system that the website possess new content. The host affinity method 770 checks for changed content for sections of the website whose content derives from the same host as the user-entered URL.

The user selectable content sections 475 allow a user to select content sections for new content utilizing known navigation and selection techniques. The selection can be performed using a pointing device 105 such as a mouse or a keyboard 104. Upon selection, only changes in those content sections as delimited by physical region or HTML tags may indicate to the system that new content is available at the specified URL.

Figure 8:
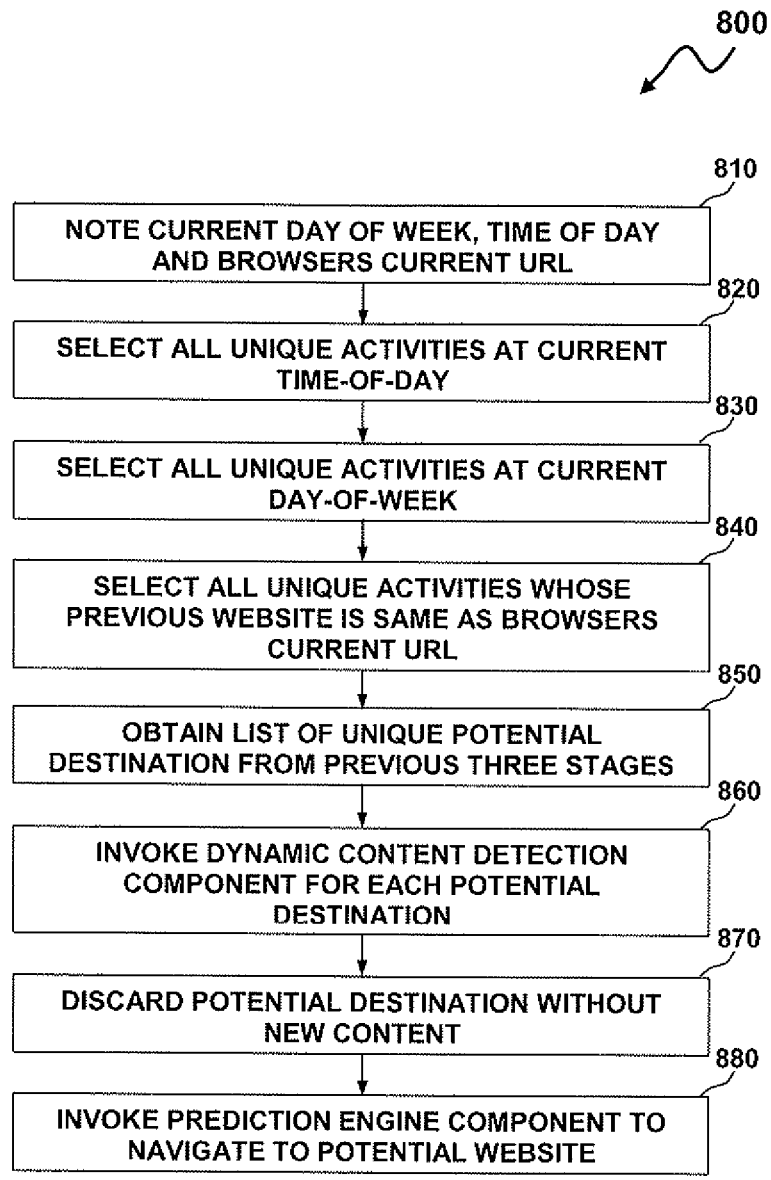
FIG. 8 illustrates a detailed flow chart of operations illustrating logical operational steps of a method for enabling predictive browsing, which can be implemented in accordance with a preferred embodiment.

Referring to FIG. 8, a detailed flow chart of operations illustrating logical operational steps of a method 800 for enabling predictive browsing is illustrated, which can be implemented in accordance with a preferred embodiment. Note that methods 700, 800, and 900 illustrated and described herein can be implemented in the context of a computer-useable medium that contains a program product. The methods 700-900 depicted in FIGS. 7-9 can also be implemented in a computer-usable medium containing a program product.

FIG. 8 indicates that the current day-of-week, time-of-day and browsers' current URL can be noted, as shown at block 810. The unique activities occurring at the current time-of-day can be selected from the activity storage component 440, as depicted at block 820. Thereafter, as indicated at block 830, unique activities occurring at current day-of-week can be selected. Next, as depicted at block 840, unique activities whose previous website is the same as the browser's current URL can be selected. A list of unique potential destinations from the previous three stages can be obtained, as depicted at block 850. The dynamic content detection component 455 can be invoked for each potential destination, as depicted at block 860. The potential destination without new content can be discarded, as shown at block 870. The prediction engine component 420 can be invoked to navigate to potential website 510, as illustrated at block 880.

Figure 9:
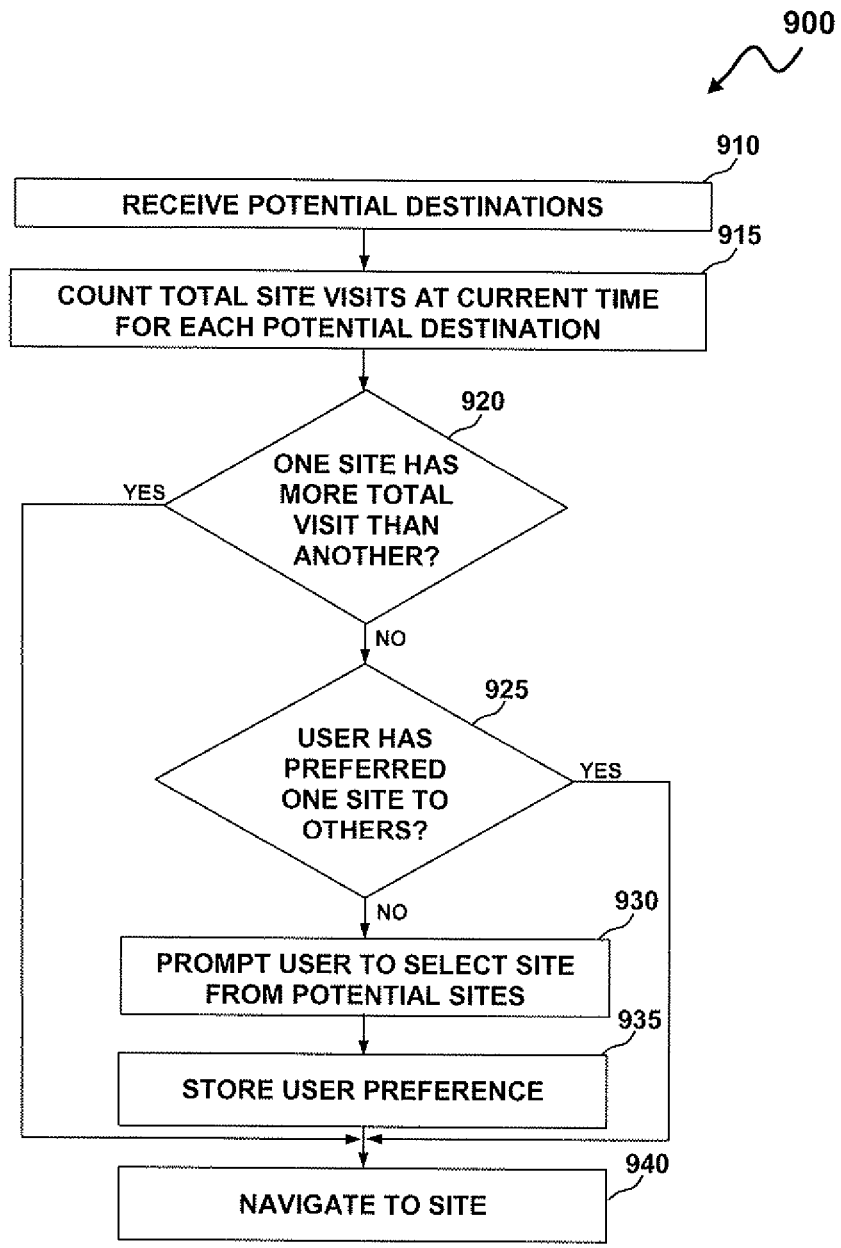
FIG. 9 illustrates a detailed flow chart of operations illustrating logical operational steps of a method for verifying content updates, which can be implemented in accordance with a preferred embodiment.

Referring to FIG. 9, a detailed flow chart of operations illustrating logical operational steps of a method 900 for verifying content updates is illustrated, which can be implemented in accordance with a preferred embodiment. The potential destinations can be received, as illustrated at block 910. The total site visits at current time for each potential destination from the activity storage component 440 can be counted, as depicted at block 915. A determination can be made whether one site has more total visits that another, as depicted at block 920. If a site possesses more total visits the browser can be navigated to that site, as shown at block 940. Otherwise, a determination can be made whether a user has preferred a site to another, as shown at block 925. If the user preferred a site the browser can be navigated to that site, as shown at block 940. Otherwise, the user can be prompted to select a site from the potential sites, as depicted at block 930. Thereafter, as illustrated at block 935, the user preferences can be stored and the site can be navigated. Thereafter, the dynamic content detection engine component 455 can be invoked in order to detect whether the site has been updated. This reduces the total rendering time of the web page by removing the network latency and current download time required before rendering of a web page.

Figure 10:
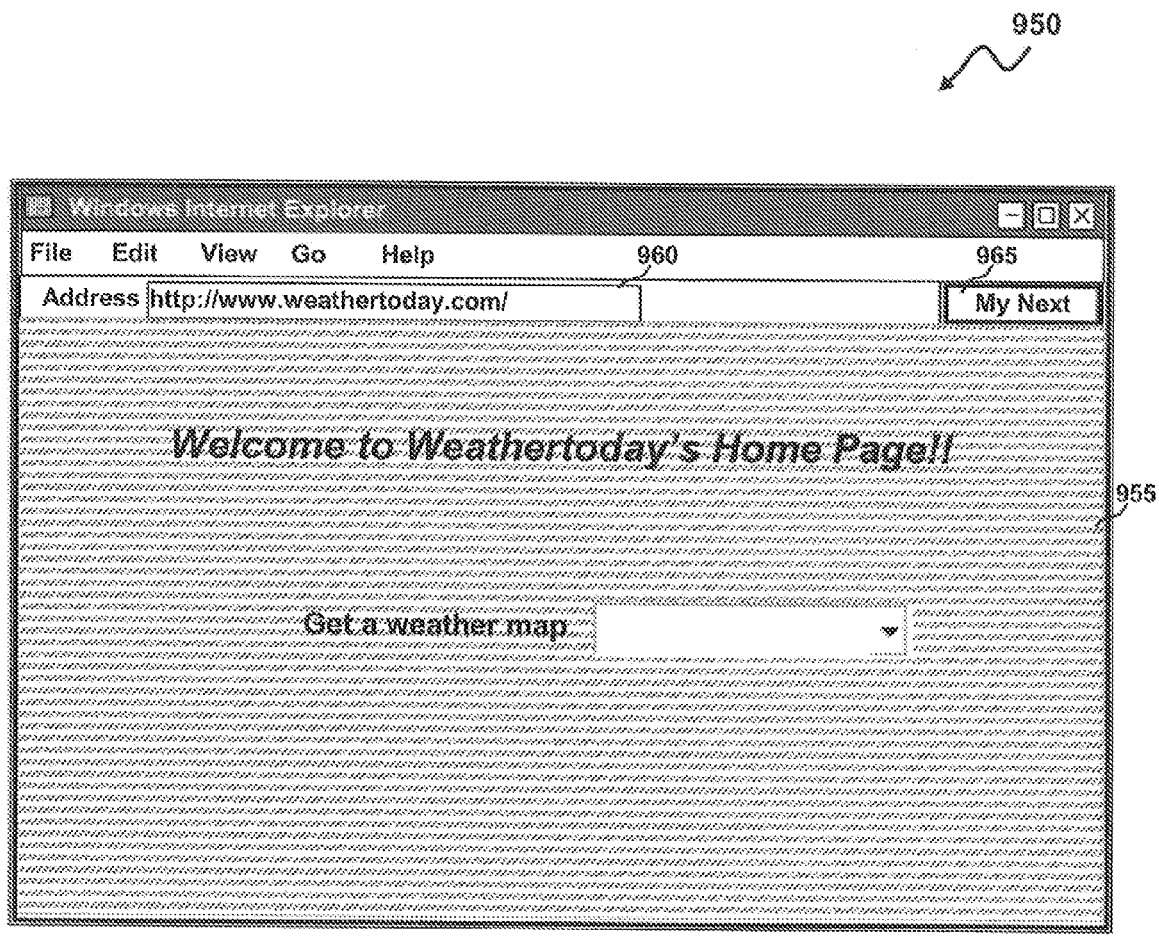
FIG. 10 depicts an exemplary user interface of a web browser, which can be implemented in accordance with a preferred embodiment.

FIG. 10 depicts an exemplary user interface of a web browser 950, which can be implemented in accordance with a preferred embodiment. The web browser window 950 displays a web page 955 corresponding to a URL shown in the address field 960. The user interface of the web browser 950 can be modified to include a website selection control such a button 965 as shown in FIG. 10. The button 965 can be utilized to invoke the predictive web browsing and can be marked "My Next" or some similar indicating text which loads the next predicted website into the browser 950. The button 965 can also open up several tabs that contain the next few predicted websites for visiting. The predictive behavior of the present invention minimizes the time spent searching the bookmarks folder or manually typing in website addresses.

In web browsers that support tabs, the web browser window 950 may display predicted website 510 in the current tab, most recent tab, a new tab, or any other preference established, such as one which a user may select. Such a selection may be broadly implemented, or may be implemented at a very granular level, such as to enable a user to specify how individual websites or web pages will be rendered. Similarly, the choice of which tab to render a web page may be presented with the button 965.

The present invention described herein may be realized as a software module 152 such as, for example, the application module 152 of computer software system 150 depicted in FIG. 2. The software module 152 can be implemented into the web browser 950 such as Firefox® or Microsoft® Internet Explorer®. The software module 152 can be included as plug-ins to browsers such as Internet Explorer® and Firefox®. The software module 152 can also be invoked using mouse gestures. This enables navigation to websites of interest and optionally bypassing the websites 510 that have not updated since the last visit. The invention enables the user to navigate to the page, permitting the user to browse those websites 510 faster.

Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent. Thus, the method 600, 800 and 900 described herein can be deployed as process software in the context of a computer system or data-processing system as that depicted in FIGS. 1-3.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data-processing system including, but not limited to, personal computers, servers, workstations, network computers, main frame computers, routers, switches, Personal Digital Assistants (PDA's), telephones, and any other system capable of processing, transmitting, receiving, capturing and/or storing data.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for automated website browsing, the method comprising:
   a computer obtaining a plurality of attributes associated with a visited website; based on a web browser being navigated to the visited website, said computer predicting that the web browser will be navigated from the visited website to a next website, the predicting being based, at least in part, on a history of navigating the web browser to the next website from the visited website, and based, at least in part, on the plurality of attributes associated with the visited website;
   based on the predicting, said computer automatically navigating the web browser to the next website from the visited website absent entry of a uniform resource locator of the next website into the web browser by a user, wherein automatically navigating the web browser to the next website comprises displaying the next website in the web browser;
   displaying a website selection control in the web browser for selection by the user of the web browser; and
   after selection of the website selection control by the user of the web browser, initiating said predicting and said automatically navigating the web browser to the next website.

2. The method of claim 1 wherein said plurality of attributes comprise a browsing frequency, length, day-of-week, time-of-day, and number of visits to the visited website, and a uniform resource locator of the visited website, and wherein the plurality of attributes are stored in a data store.

3. The method of claim 1, wherein the predicting comprises:
   said computer determining at least one potential next website, of a plurality of visited websites, to automatically load in the web browser, based, at least in part, upon a history of navigating to the at least one potential next website from said visited website, and based, at least in part, on said plurality of attributes associated with said visited website;
   said computer verifying content updates corresponding to said at least one potential next website; and
   said computer selecting the next website from the at least one potential next website.

4. The method of claim 3, wherein said computer verifying content updates comprises at least one of:
   said computer examining headers to detect if content of said at least one potential next website has changed since a last time said at least one potential next website was visited;
   said computer determining if said content has changed since said last time said at least one potential next website was visited;
   said computer detecting a section of said at least one potential next website that is dynamic; and
   said computer prompting a user to select a portion of said at least one potential next website.

5. The method of claim 3, wherein the computer determining the at least one potential next website to automatically load in the web browser further comprises:
   the computer identifying a current uniform resource locator of the web browser, the current uniform resource locator being a uniform resource locator of the visited website to which the web browser is currently navigated; and the computer identifying which websites of the plurality of visited websites were navigated to from the current uniform resource locator, and which were visited at a same time-of-day as a current time-of-day and a same day-of-week as a current day-of-week.

6. The method of claim 3, wherein the at least one potential next website comprises a plurality of potential next websites, and wherein the computer selecting the next website from the plurality of potential next websites comprises:
the computer determining, for each website of the plurality of potential next websites, a total number of visits at a current time-of-day;
the computer determining whether any single website of the plurality of potential next websites has more total visits than every other website of the plurality of potential next websites; and
responsive to a single website having more total visits than every other website of the plurality of potential next websites, the computer selecting the single website as the next website to load in the web browser.

7. The method of claim 3, wherein the at least one potential next website comprises a plurality of potential next websites, and wherein the computer selecting the next website from the plurality of potential next websites comprises:
the computer determining, for each website of the plurality of potential next websites, a total number of visits at a current time-of-day;
the computer determining whether any single website of the plurality of potential next websites has more total visits than every other website of the plurality of potential next websites; and
responsive to no website of the plurality of potential next websites having more total visits than every other website of the plurality of potential next websites:
the computer determining whether the user has indicated a preference of one website of the plurality of potential next websites over all other websites of the plurality of potential next websites; and
responsive to the user not having indicated preference of one website:
the computer prompting selection of a preference of one website by the user;
the computer storing the selected preference of the one website in a preference table; and
the computer selecting the one website as the next website to load in the web browser.

8. A computer system comprising a processor and computer readable storage medium, said computer readable storage medium storing computer program code configured to be executed by the processor to implement a method for automated website browsing, the method comprising:
obtaining a plurality of attributes associated with a visited website; based on a web browser being navigated to the visited website, predicting that the web browser will be navigated from the visited website to a next website, the predicting being based, at least in part, on a history of navigating the web browser to the next website from the visited website, and based, at least in part, on the plurality of attributes associated with the visited website;
based on the predicting, automatically navigating the web browser to the next website from the visited website absent entry of a uniform resource locator of the next website into the web browser by a user, wherein automatically navigating the web browser to the next website comprises displaying the next website in the web browser;
displaying a website selection control in the web browser for selection by the user of the web browser; and
after selection of the website selection control by the user of the web browser, initiating said predicting and said automatically navigating the web browser to the next website.

9. The computer system of claim 8, wherein said plurality of attributes comprise a browsing frequency, length, day-of-week, time-of-day, and number of visits to the visited website, and a uniform resource locator of the visited website, and wherein the plurality of attributes are stored in a data store.

10. The computer system of claim 8, wherein the predicting comprises:
determining at least one potential next website, of a plurality of visited websites, to automatically load in the web browser, based, at least in part, upon a history of navigating to the at least one potential next website from said visited website, and based, at least in part, on said plurality of attributes associated with said visited website;
verifying content updates corresponding to said at least one potential next website; and
selecting the next website from the at least one potential next website.

11. The computer system of claim 10, wherein the verifying content updates comprises at least one of:
examining headers to detect if content of said at least one potential next website has changed since a last time said at least one potential next website of interest was visited;
determining if said content has changed since said last time said at least one potential next website was visited;
detecting a section of said at least one potential next website that is dynamic; and
prompting a user to select a portion of said at least one potential next website.

12. The computer system of claim 10, wherein the determining the at least one potential next website to automatically load in the web browser comprises:
identifying a current uniform resource locator of the web browser, the current uniform resource locator being a uniform resource locator of the visited website to which the web browser is currently navigated; and
identifying which websites of the plurality of visited websites were navigated to from the current uniform resource locator, and which were visited at a same time-of-day as a current time-of-day and a same day-of-week as a current day-of-week.

13. The computer system of claim 10, wherein the at least one potential next website comprises a plurality of potential next websites, and wherein the selecting the next website from the plurality of potential next websites comprises:
determining, for each website of the plurality of potential next websites, a total number of visits at a current time-of-day;
determining whether any single website of the plurality of potential next websites has more total visits than every other website of the plurality of potential next websites; and
responsive to a single website having more total visits than every other website of the plurality of potential next websites, selecting the single website as the next website to load in the web browser.

14. The computer system of claim 10, wherein the at least one potential next website comprises a plurality of potential next websites, and wherein the selecting the next website from the plurality of potential next websites comprises:

determining, for each website of the plurality of potential next websites, a total number of visits at a current time-of-day;

determining whether any single website of the plurality of potential next websites has more total visits than every other website of the plurality of potential next websites; and responsive to no website of the plurality of potential next websites having more total visits than every other website of the plurality of potential next websites:

determining whether the user has indicated a preference of one website of the plurality of potential next websites over all other websites of the plurality of potential next websites; and responsive to the user not having indicated preference of one website:

prompting selection of a preference of one website by the user;

storing the selected preference of the one website in a preference table; and selecting the one website as the next website to load in the web browser.

15. A computer-usable storage medium storing computer program code, said computer program code comprising program instructions executable by a processor to perform a method comprising:

obtaining a plurality of attributes associated with a visited website;

based on a web browser being navigated to the visited website, predicting that the web browser will be navigated from the visited website to a next website, the predicting being based, at least in part, on a history of navigating the web browser to the next website from the visited website, and based, at least in part, on the plurality of attributes associated with the visited website;

based on the predicting, automatically navigating the web browser to the next website from the visited website absent entry of a uniform resource locator of the next website into the web browser by a user, wherein automatically navigating the web browser to the next website comprises displaying the next website in the web browser;

displaying a website selection control in the web browser for selection by the user of the web browser; and after selection of the website selection control by the user of the web browser, initiating said predicting and said automatically navigating the web browser to the next website.

16. The computer-usable storage medium of claim 15, wherein said plurality of attributes comprise a browsing frequency, length, day-of-week, time-of-day, and number of visits to the visited website, and a uniform resource locator of the visited website, and wherein the plurality of attributes are stored in a data store.

17. The computer-usable storage medium of claim 15, wherein the predicting comprises:

determining at least one potential next website, of a plurality of visited websites, to automatically load in the web browser, based, at least in part, upon a history of navigating to the at least one potential next website from said visited website, and based, at least in part, on said plurality of attributes associated with said visited website;

verifying content updates corresponding to said at least one potential next website; and selecting the next website from the at least one potential next website.

18. The computer-usable storage medium of claim 17, wherein the verifying content updates comprises at least one of:

examining headers to detect if content of said at least one potential next website has changed since a last time said at least one potential next website was visited;

determining if said content has changed since said last time said at least one potential next website was visited;

detecting a section of said at least one potential next website that is dynamic; and prompting a user to select a portion of said at least one potential next website.

19. The computer-usable storage medium of claim 17, wherein the determining the at least one potential next website to load in the web browser comprises:

identifying a current uniform resource locator of the web browser, the current uniform resource locator being a uniform resource locator of the visited website to which the web browser is currently navigated; and identifying which websites of the plurality of visited websites were navigated to from the current uniform resource locator, and which were visited at a same time-of-day as a current time-of-day and a same day-of-week as a current day-of-week.

20. The computer-usable storage medium of claim 17, wherein the at least one potential next website comprises a plurality of potential next websites, and wherein the selecting the next website from the plurality of potential next website comprises:

determining for each website of the plurality of potential next websites, a total number of visits at a current time-of-day;

determining whether any single website of the plurality of potential next websites has more total visits than every other website of the plurality of potential next websites; and responsive to no website of the plurality of potential next websites having more total visits than every other website of the plurality of potential next websites:

determining whether the user has indicated a preference of one website of the plurality of potential next websites over all other websites of the plurality of potential next websites; and responsive to the user not having indicated preference to one website:

prompting selection of a preference to one website by the user;

storing the selected preference to one website in a preference table; and selecting the one website as the next website to load in the web browser.

* * * * *